(12) United States Patent  (10) Patent No.: US 7,397,215 B2
Lelkes  (45) Date of Patent: Jul. 8, 2008

(54) MODULATION METHOD FOR BRIDGE CIRCUITS FOR THE PARTICULAR CONTROL OF DIRECT CURRENT MOTORS

(75) Inventor: Andras Lelkes, Bad Dürrheim (DE)

(73) Assignee: Minebea Co., Ltd., Nagano-ken (JP)

( * ) Notice: Subject to any disclaimer, the term of this patent is extended or adjusted under 35 U.S.C. 154(b) by 195 days.

(21) Appl. No.: 11/398,056

(22) Filed: Apr. 5, 2006

(65) Prior Publication Data

US 2006/0226798 A1 Oct. 12, 2006

(30) Foreign Application Priority Data

Apr. 8, 2005 (DE) .................. 10 2005 016 077

(51) Int. Cl.
*G05B 11/28* (2006.01)
(52) U.S. Cl. .................. 318/599; 318/606; 318/800; 318/801
(58) Field of Classification Search ............. 388/815, 388/811, 814; 318/599, 606, 800, 801
See application file for complete search history.

(56) References Cited

U.S. PATENT DOCUMENTS 5,363,208 A * 11/1994 Ogino et al. ............... 358/3.02

* cited by examiner

*Primary Examiner*—Karen Masih
(74) *Attorney, Agent, or Firm*—Cooper & Dunham LLP

(57) ABSTRACT

The invention relates to methods and systems for modulating the supply voltage of an electric load, particularly an electric motor, fed by a bridge circuit, wherein the load is switched as a function of a predetermined setpoint value for the input current or the input power by means of power electronics to an intermediate circuit voltage. A modulation method is disclosed in which, instead of the winding current (or the winding currents in the case of multi-strand motors), the intermediate circuit current or the input power of the motor is used as the actual value for regulation. The switch-on times for the modulation of the motor voltage are predetermined at a set frequency by a controller, such as a microcontroller or a timer. The switch-off times are determined such that the average value of the intermediate circuit current corresponds to a predetermined setpoint value.

17 Claims, 3 Drawing Sheets

State of the art

State of the art

MODULATION METHOD FOR BRIDGE CIRCUITS FOR THE PARTICULAR CONTROL OF DIRECT CURRENT MOTORS

BACKGROUND OF THE INVENTION

The invention relates to a modulation method for bridge circuits for the particular control of direct current motors, including brushless DC motors, according to the preamble of patent claim 1.

DESCRIPTION OF THE PRIOR ART

Conventionally, PI current controllers are frequently used in combination with pulse width modulation (PWM) or two-stage current controllers, called bang-bang controllers, for the control of (brushless) DC motors. In using these methods, however, it is necessary to measure the currents in the motor windings in an expensive procedure. In addition, PI controllers are very sensitive to changes in input parameters, which could result in an increase in the control time or the oscillation tendency. What is more, changes in the modulation frequency for two-stage current controllers are problematic.

In controlling the speed of brushless motors as well as commutator motors which are fed by a bridge circuit, cf. FIG. 1, the winding voltage $U_W$ is influenced by modulation. Taking a single-strand DC motor 1 by way of example, FIG. 1 shows that the single stator winding is switched by a converter 2 having a plurality of power switches T1-T4 (mostly MOSFET power transistors to which appropriate recovery diodes are connected in parallel) with alternating polarity to the intermediate circuit voltage $U_{DC}$, so that the winding voltage $U_W$ is alternatively $U_W=+U_{DC}$ or $U_W=-U_{DC}$ respectively. Here, two power switches are always conductive at the same time, such as T1 and T4, while the other two power switches T2 and T3 block conduction. In the next commutation, T1 and T4 are then switched off and T2 and T3 switched on.

Various modulation methods for the control voltage of the power switches are known:

Pulse Width Modulation (PWM) Without Current Regulation (FIG. 2a):

The control voltage of the power switches is clocked with a specific frequency by a pulse width modulator 3, the relationship between the switch on and off time of the voltage being predetermined. The power switches in the converter 2, and thus the motor 1, are controlled by this PWM voltage. In order to protect the electronics and the motor, it is necessary to monitor the motor current. In case of overload, the motor is switched off. This certainly goes to protect the motor, but it could have a negative impact on the application.

Pulse Width Modulation Having PI Current Control (FIG. 2b):

Should it be necessary to regulate the current, a current controller 4, mostly a PI or a PID controller, puts out a voltage setpoint that is fed to the pulse width modulator 3. The disadvantages of this method are its limited dynamics, the need to measure the winding current and the need to parameterize the controller. If the parameters (P/I/D) are incorrectly set, the controller is too slow or it oscillates. Limiting the voltage (maximum 100%) can result in the so-called wind-up effect which can also weaken the dynamics.

Two-Position Current Control (FIG. 2c)

A two-position controller 5 modulates the power switches of the converter 2 directly and there is no need for an additional modulator. The advantage of this method is its excellent dynamics. What is more, there are no parameters that need to be set, which could have a negative impact on the dynamics.

The only parameter is the hysteresis of the controller which influences the clock frequency. The disadvantages of this method are the need to measure the winding current and the dependency of the clock frequency on the operating point. Particularly as a result of the non-constant clock frequency that not only complicates the thermal dimensioning of the power circuit but also the EMC design, this controller is being applied less and less.

Other possibilities include:

State Controller

Improved dynamics can be achieved by using a state controller. However, its realization is more complex than in the case of the two above-mentioned methods. The controller has a large number of parameters that have no physical significance and whose adjustment is complicated even for experts.

Fuzzy Controller

Optimizing and in particular verifying these kinds of non-linear fuzzy controllers is very complicated.

SUBJECT MATTER OF THE INVENTION

It is the object of the invention to realize a new modulation method, particularly for electric motors, which avoids the disadvantages of the known modulation methods such as the need to measure the winding current, the poor dynamics or the need to take account of a large number of parameters.

This object has been achieved according to the invention by a method having the characteristics outlined in claim 1.

Advantageous embodiments and additional improvements on the invention can be derived from the subordinate claims.

In a preferred solution according to the invention the current is regulated in the intermediate circuit. If in a brushless motor one of the active power switches is switched off as a result of modulation, the winding current flows via the power switches that have remained active and via a recovery diode that is connected in parallel to the switched-off power switches. This means that this current does not flow via the sensor for measuring the intermediate circuit current. According to the invention, the switch-on times for the modulation of the motor voltage are predetermined at a set frequency by a controller, such as a microcontroller or a timer. The switch-off times are determined such that the average value of the intermediate circuit current corresponds to a predetermined setpoint value. Since the intermediate circuit current is zero after the power switch to be clocked has been switched off, the result is:

$$I_{Average} = \frac{1}{T}\int_0^T i_{DC} dt = \frac{1}{T}\int_0^{ton} i_{DC} dt \quad (1)$$

This makes it easy to determine the power on-time (pulse length ton):

$$\int_0^{ton} i_{DC} dt = T \cdot I_{soll} \quad (2)$$

with $i_{DC}$=intermediate circuit current, ton=(pulse length) switch-on time, $I_{soll}$=setpoint current.

In the event that $$\int_0^T i_{DC}dt < T \cdot I_{soll},$$

a maximum PWM is set which is either 100% or alternatively it is set at a maximum upper limit of 98%, for example.

According to another embodiment of the invention, instead of the intermediate circuit current, the input power of the motor can be regulated in the same way since the motor does not use up any power after the pulsed power switches have been switched off, with the result:

$$P_1 = \frac{1}{T}\int_0^T u_{DC}i_{DC}dt = \frac{1}{T}\int_0^{ton} u_{DC}i_{DC}dt \quad (3)$$

Therefore:

$$\int_0^{ton} u_{DC}i_{DC}dt = T \cdot P_{1soll} \quad (4)$$

Thus according to the invention, a modulation method is proposed in which, instead of the winding current (or the winding currents in the case of multi-strand motors), the intermediate circuit current or the input power of the motor is used as the actual value for regulation. It is easier to measure the intermediate circuit current or the input power since the electric potential of the intermediate circuit bar remains unchanged, whereas the potential of a motor winding fed by a bridge circuit is subject to continuous rapid changes. The controller does not require any parameter setting which makes dimensioning and start-up very much easier. It has high dynamics and can be easily realized using either analogue or digital technology. Another important advantage is that the modulation frequency can be kept constant.

DESCRIPTION OF PREFERRED EMBODIMENTS OF THE INVENTION

Figure 1:
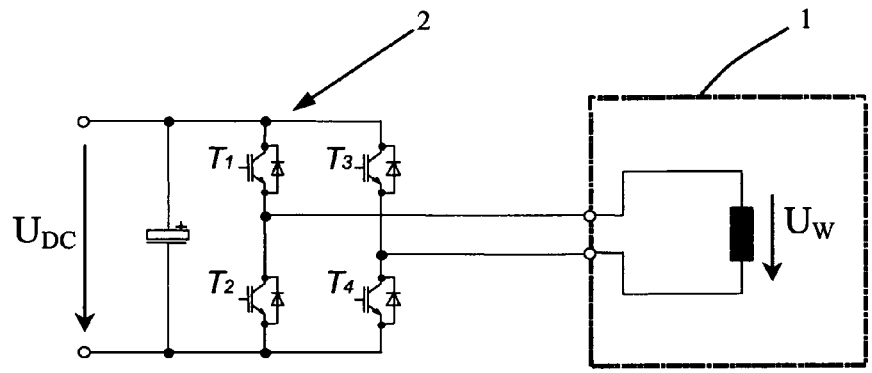
FIG. 1 shows a simplified block diagram of a single-strand, brushless DC motor having power electronics in a bridge circuit.
Figure 2:
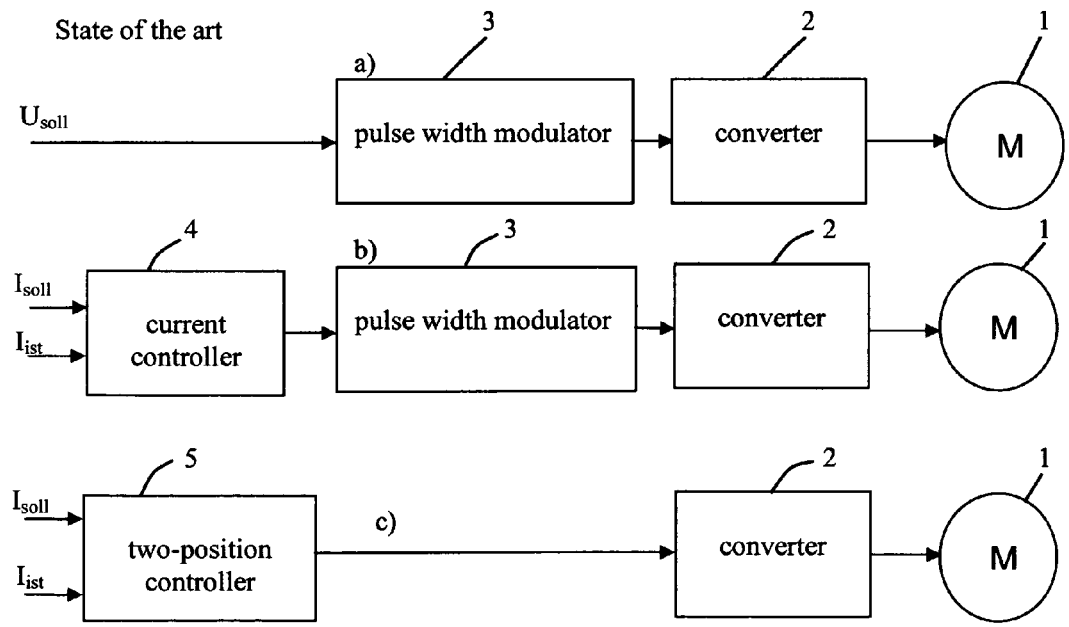
FIG. 2 shows various realizations for the circuits of control systems according to the prior art.
Figure 3:
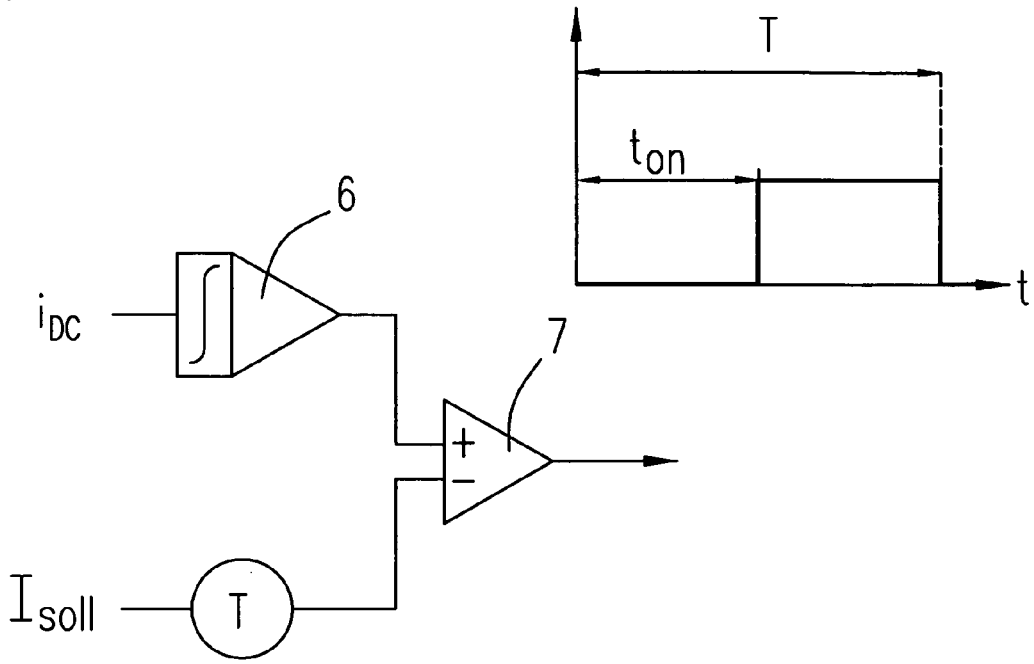
FIG. 3 schematically shows a control circuit for the modulation of the power switches according to a first embodiment of the invention.

In the embodiment according to FIG. 3, the current is regulated in the intermediate circuit, i.e. the measured value of the intermediate circuit current $i_{DC}$ is integrated using an integrator 6 and the integral is compared by means of a comparator 7 with the value $T \cdot I_{soll}$, i.e. the setpoint value of the motor current $I_{soll}$ multiplied by the period T. When the integral reaches this value $T \cdot I_{soll}$, the pulsed power switch is switched off. If the switch is switched on periodically and the integrator started simultaneously, the current controller operates at a constant frequency f=1/T.

Figure 4:
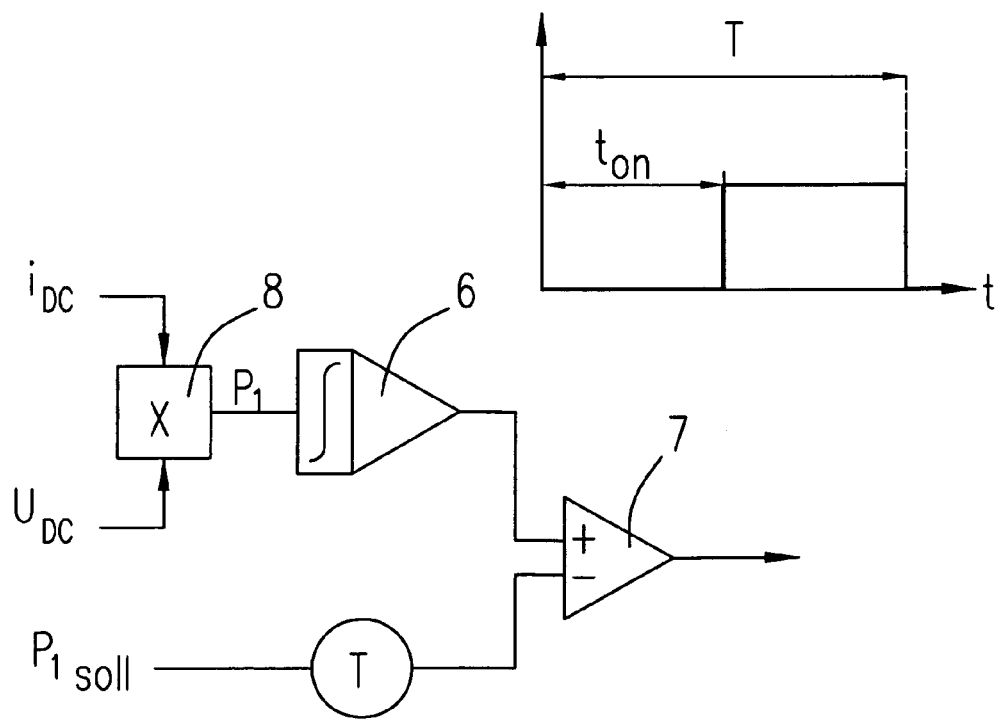
FIG. 4 schematically shows a control circuit for the modulation of the power switches according to a second embodiment of the invention.

According to another embodiment of the invention, instead of the intermediate circuit current, the input power of the motor can be regulated in the same way since the motor does not use up any power after the pulsed power switches have been switched off. The respective realization of this kind of power-related controller can be seen in FIG. 4. The measured values of the intermediate circuit current $i_{DC}$ and the intermediate circuit voltage $U_{DC}$ are multiplied and integrated using an integrator 6. The integral is compared by means of a comparator 7 with the value $T \cdot P1_{soll}$, i.e. the setpoint value of the input motor power $P_{1soll}$ multiplied by the period T. When the integral reaches this value $T \cdot P_{1soll}$, the pulsed power switch is switched off. If the switch is switched on periodically and the integrator started simultaneously, the current controller operates at a constant frequency.

The control system can be built up of discrete components or integrated in a mixed-signal ASIC. Another possibility involves the use of programmable digital and/or analogue components.

Figure 5:
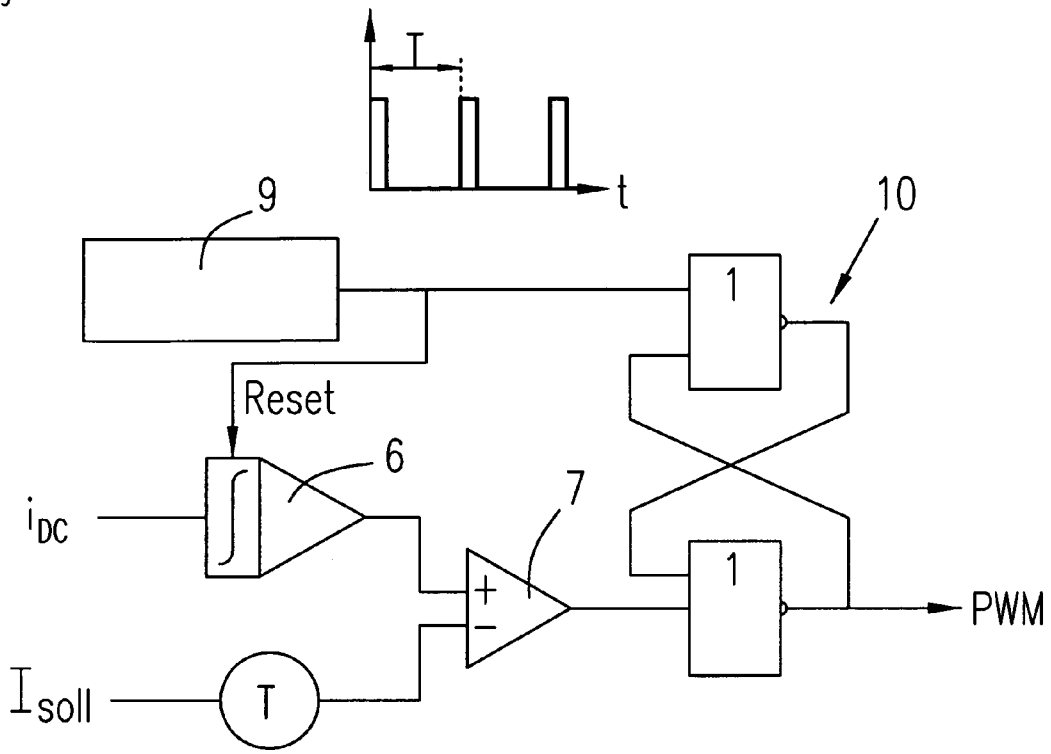
FIG. 5 schematically shows a control circuit for the modulation of the power switches according to a third embodiment of the invention.

FIG. 5 shows an example of a possible realization. A pulse generator 9 starts the process periodically with a period T with which it determines the switching frequency of the modulation. With the starting pulse, the integrator 6 is reset and the output of an RS flip-flop 10, constructed here from NOR gates, is set at high. This goes to switch on the pulsed power switch in the bridge circuit. When the integrator 6 obtains the pre-set limiting value $T \cdot I_{soll}$, the flip-flop 10 is reset by the comparator 7, with the result that the activated power switch is switched off. Instead of a static flip-flop 10, edge-triggered flip-flops can of course be used as well.

Figure 6:
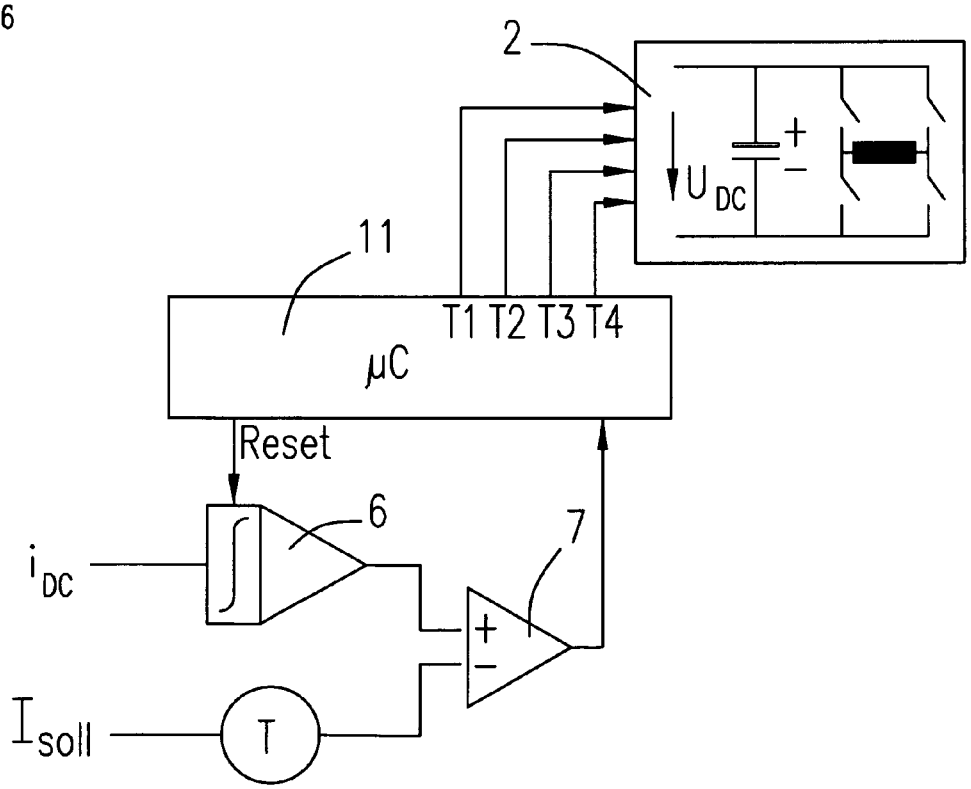
FIG. 6 schematically shows a control circuit for the modulation of the power switches according to a fourth embodiment of the invention.

FIG. 6 shows an example of a possible realization of the invention having a microcontroller (μC) 11. Here, a periodic start signal for the integration process and the switching on of the activated power switch is generated internally in the microcontroller 11, either software-based or via an internal timer/counter component. The output of the comparator 7 is led back into the microcontroller. The output signal of the comparator 7 may either be periodically polled by the microcontroller 11 via the software or the signal can be fed to an interrupt input of the microcontroller. In this event, the switching edge of the comparator output signal generates an interrupt. A corresponding interrupt routine then switches the activated power switches off. Microcontrollers having integrated analogue comparators are also available. In this case, instead of an external analogue comparator 7, an internal analogue comparator may be used.

If a fast digital signal processor (DSP) is used, there is no need for an external integrator 6. Here, the DSP can digitalize the analogue measured value $i_{DC}$ using an integrated fast digital analogue converter and digitally integrate the value via the software. After comparing the integrated value with a predetermined limiting value, the DSP can control the power switches directly without the need for additional external components. It goes without saying that in these examples the microcontroller or the DSP does not only effect the modulation of the power switches required for current regulation but in the case of brushless motors it also takes care of commutation using a known method.

The principle presented in the invention can also be used for the control of multi-strand motors. For example, in the case of three-strand brushless motors mostly only two of three power switches (one power switch per strand) are switched on simultaneously. For controlling the motor, one of the two power switches is clocked. If this power switch is switched off, there is no current flow in the intermediate circuit. As a result, the same principle presented in the invention can be applied here.

In the case of a fan or pump application, the shaft output of the motor increases with the cube of the rotational speed. Assuming that the motor efficiency remains approximately constant, the same applies to the input power. This means that the motor speed can be directly controlled via the reference value $I_1$ (input current) or $P_1$ (electric input power). With suitable compensation, the shaft output itself, thus the mechanical output power of the motor, may be reproduced and as a result directly controlled using the same basic method. For other applications, it might be worthwhile setting up a cascade control. The inner control loop regulates the input current or the input power of the bridge circuit according to the principle of the invention. The superimposed control loop regulates the motor speed, for example. This makes it possible to realize a highly dynamic servo drive among other features.

The control method is naturally not restricted to motor applications. It can rather be used for any electric load that is fed by a bridge circuit or by a similar power electronic switch. The only requirement is that the measurands to be controlled have to be zero after the pulsed power switch has been switched off. If this requirement is met, the equations (1) to (4) can be used for modulation in this or in a modified form.

IDENTIFICATION REFERENCE LIST

1 Motor/electric load
2 Converter (power electronics)
3 Pulse width modulator
4 Current controller
5 Two-position controller
6 Integrator
7 Comparator
8 Multiplier
9 Pulse generator
10 Flip-flop (bistable trigger circuit)
11 Microcontroller

The invention claimed is:

1. A method for modulating the supply voltage of an electric load fed by a bridge circuit, wherein the load is switched as a function of a predetermined setpoint value for the input current $i_{soll}$ by means of power electronics to an intermediate circuit voltage $U_{DC}$, characterized in that pulse modulation having a period T is effected, wherein the switch-on times are predetermined and the switch-off times are chosen such that the integral of the intermediate circuit current $i_{DC}$ over the period T corresponds to a predetermined setpoint value $T\,I_{soll}$.

2. A method according to claim 1, characterized in that a DC motor is used as the electric load.

3. A method according to claim 2, characterized in that a brushless DC motor is used as the electric load.

4. A method according to claim 3, characterized in that the at least one stator winding of the DC motor is switched by means of the power electronics as a function of the rotor position with alternating polarity to the intermediate circuit voltage $U_{DC}$.

5. A method according to claim 3, characterized in that the DC motor has a plurality of stator windings which are switched by means of the power electronics as a function of the rotor position either individually or in multiples to the intermediate circuit voltage $U_{DC}$.

6. A method for modulating the supply voltage of an electric load fed by a bridge circuit, wherein the load is switched as a function of a predetermined setpoint value for the input power $P_{1soll}$ by means of power electronics to an intermediate circuit voltage $U_{DC}$, characterized in that a pulse modulation having a period T is effected, wherein the switch-on times are predetermined and the switch-off times are chosen such that the integral of the input power $P_1 = u_{DC} i_{DC}$ over the period T corresponds to a setpoint value $T\,P_{1soll}$.

7. A method according to claim 6, characterized in that a DC motor is used as the electric load.

8. A method according to claim 7, characterized in that a brushless DC motor is used as the electric load.

9. A control system for modulating the supply voltage of a load fed by a bridge circuit, wherein the load is switched as a function of a predetermined setpoint value for the input current $i_{soll}$ by means of power electronics to an intermediate circuit voltage $U_{DC}$, characterized by a pulse generator (9) to put out pulses having the period T,
an integrator (6) for the integration of the intermediate circuit current $i_{DC}$ over the period T, wherein the integrator is reset by the pulses of the pulse generator,
a comparator (7) to compare the integrated value with a predetermined setpoint value $T \cdot I_{soll}$, wherein the comparator sends out a signal when the setpoint value is exceeded,
a bistable trigger circuit (10) that is switched to a first state by the pulses of the pulse generator and is switched to a second state by the signal of the comparator.

10. A control system according to claim 9, characterized in having discrete electronic components.

11. A control system according to claim 9, further comprising a microcontroller (11) or a digital signal processor.

12. A control system according to claim 9, characterized in that the power electronics is a converter in a bridge circuit.

13. A control system for modulating the supply voltage of a load (1) fed by a bridge circuit, wherein the load is switched as a function of a predetermined setpoint value for the input power $P_{1soll}$ by means of power electronics (2) to an intermediate circuit voltage $U_{DC}$, characterized by a pulse generator (9) to put out pulses having the period T,
an integrator (6) for the integration of the input power $P_1 = u_{DC} i_{DC}$ over the period T,
wherein the integrator is reset by the pulses of the pulse generator,
a comparator (7) to compare the integrated value with a predetermined setpoint value $T \cdot P_{1soll}$, wherein the comparator sends out a signal when the setpoint value is exceeded,
a bistable trigger circuit (10), that is switched to a first state by the pulses of the pulse generator and is switched to a second state by the signal of the comparator.

14. A control system according to claim 13, characterized in that the electric load (1) is an electric motor.

15. A control system according to claim 14, characterized in that the electric load (1) is a brushless electric motor.

16. A control system according to claim 13, further comprising a microcontroller (11) or a digital signal processor.

17. A control system according to claim 13, characterized in that the power electronics is a converter in a bridge circuit.

* * * * *